US011169344B2

(12) United States Patent
LeBlanc et al.

(10) Patent No.: US 11,169,344 B2

(45) Date of Patent: Nov. 9, 2021

(54) COMMON MODULE STORAGE WITHIN A FIBER DISTRIBUTION HUB

(71) Applicant: CommScope Technologies LLC, Hickory, NC (US)

(72) Inventors: Thomas G. LeBlanc, Westminster, MA (US); Erik J. Gronvall, Bloomington, MN (US); Kimberly Ann Haller, Belle Plaine, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/286,791

(22) Filed: Feb. 27, 2019

(65) Prior Publication Data

US 2019/0265427 A1 Aug. 29, 2019

Related U.S. Application Data

(60) Provisional application No. 62/635,865, filed on Feb. 27, 2018.

(51) Int. Cl.

*G02B 6/44* (2006.01)
*G02B 6/38* (2006.01)

(52) U.S. Cl.

CPC ......... *G02B 6/4452* (2013.01); *G02B 6/3897* (2013.01); *G02B 6/4442* (2013.01); *G02B 6/4446* (2013.01)

(58) Field of Classification Search

None

See application file for complete search history.

(56) References Cited

U.S. PATENT DOCUMENTS

| | | | | |
|---|---|---|---|---|
| 6,208,796 | B1 * | 3/2001 | Williams Vigliaturo .................... | G02B 6/4453 324/66 |
| 6,983,095 | B2 | 1/2006 | Reagan et al. | |
| 7,088,899 | B2 | 8/2006 | Reagan et al. | |
| 7,103,255 | B2 | 9/2006 | Reagan et al. | |
| 7,146,089 | B2 | 12/2006 | Reagan et al. | |
| 7,171,102 | B2 | 1/2007 | Reagan et al. | |
| 7,198,409 | B2 | 4/2007 | Smith et al. | |
| 7,200,317 | B2 | 4/2007 | Reagan et al. | |
| 7,218,827 | B2 | 5/2007 | Vongseng et al. | |
| 7,233,731 | B2 | 6/2007 | Solheid et al. | |
| 7,277,620 | B2 | 10/2007 | Vongseng et al. | |
| 7,369,741 | B2 * | 5/2008 | Reagan ................ | G02B 6/3897 385/139 |
| 7,400,816 | B2 | 7/2008 | Reagan et al. | |
| 7,407,330 | B2 | 8/2008 | Smith et al. | |

(Continued)

OTHER PUBLICATIONS

Fiber Distribution Flub, 288 Outdoor—2/NBD 116 200; Hexatronic Cables & Interconnect Systems; 3 pages; admited as prior art as of the Feb. 27, 2018.

*Primary Examiner* — Tina M Wong

(74) *Attorney, Agent, or Firm* — Merchant & Gould P.C.

(57) ABSTRACT

A fiber distribution hub includes a module mounting location disposed within the cabinet separate from a termination field. The module mounting location includes a plurality of spaces at which various types of modules can be mounted. For example, splitter modules, connector storage modules, and/or fiber storage modules can be installed at the module mounting location. The modules can be mounted in any order or configuration. Some of the modules may be tethered together before installation at the hub.

21 Claims, 6 Drawing Sheets

(56) References Cited

U.S. PATENT DOCUMENTS 7,457,503 B2 11/2008 Solheid et al.
7,471,869 B2 12/2008 Reagan et al.
7,515,805 B2 4/2009 Vongseng et al.
7,519,259 B2 4/2009 Smith et al.
7,646,958 B1 1/2010 Reagan et al.
7,720,343 B2 5/2010 Barth et al.
7,751,672 B2* 7/2010 Smith .................... G02B 6/445 385/135
7,809,232 B2 10/2010 Reagan et al.
7,809,233 B2 10/2010 Smith et al.
7,809,234 B2 10/2010 Smith et al.
7,809,235 B2 10/2010 Reagan et al.
7,816,602 B2 10/2010 Landry et al.
7,826,706 B2 11/2010 Vongseng et al.
7,841,775 B2 11/2010 Smith et al.
7,844,159 B2 11/2010 Solheid et al.
7,844,161 B2 11/2010 Reagan et al.
7,873,255 B2 1/2011 Reagan et al.
7,980,768 B2 7/2011 Smith et al.
7,995,894 B2 8/2011 Solheid et al.
8,005,335 B2 8/2011 Reagan et al.
8,121,458 B2 2/2012 Barth et al.
8,184,940 B2 5/2012 Smith et al.
8,210,756 B2 7/2012 Smith et al.
8,224,145 B2 7/2012 Reagan et al.
8,263,861 B2 9/2012 Landry et al.
8,285,103 B2 10/2012 Reagan et al.
8,374,476 B2 2/2013 Reagan et al.
8,401,357 B2 3/2013 Solheid et al.
8,538,228 B2 9/2013 Smith et al.
8,569,618 B2 10/2013 Landry et al.
8,636,421 B2 1/2014 Smith et al.
8,718,436 B2* 5/2014 Barnes ................. G02B 6/3636 385/136
8,811,791 B2 8/2014 Solheid et al.
8,818,158 B2 8/2014 Smith et al.
9,122,019 B2 9/2015 Smith et al.
9,146,372 B2 9/2015 Reagan et al.
9,146,373 B2 9/2015 Reagan et al.
9,201,206 B2 12/2015 Smith et al.
9,250,408 B2 2/2016 Solheid et al.
9,304,276 B2 4/2016 Solheid et al.
9,335,505 B2 5/2016 Reagan et al.
9,341,798 B2 5/2016 Smith et al.
9,470,851 B2 10/2016 Smith et al.
9,541,724 B2 1/2017 Solheid et al.
9,678,292 B2 6/2017 Landry et al.
9,739,970 B2 8/2017 Reagan et al.
9,784,928 B2 10/2017 Smith et al.
10,031,307 B2* 7/2018 Claessens .............. G02B 6/445
10,078,192 B2 9/2018 Landry et al.
10,126,509 B2 11/2018 Smith et al.
10,151,896 B2 12/2018 Solheid et al.
10,168,491 B2 1/2019 Smith et al.
10,274,686 B2 4/2019 Smith et al.
10,345,539 B2 7/2019 Smith et al.
2001/0036351 A1* 11/2001 Fritz .................... G02B 6/3897 385/135
2003/0103750 A1* 6/2003 Laporte .................. G02B 6/445 385/134
2004/0141692 A1* 7/2004 Anderson ............ G02B 6/3825 385/53
2005/0002633 A1* 1/2005 Solheid ................ G02B 6/4457 385/135
2007/0189692 A1* 8/2007 Zimmel ............... G02B 6/4446 385/135
2008/0170824 A1* 7/2008 Hendrickson ........ G02B 6/4466 385/53
2008/0298764 A1* 12/2008 Bloodworth ......... G02B 6/4452 385/135
2011/0052132 A1* 3/2011 Teymouri ............. G02B 6/4441 385/135
2011/0158599 A1* 6/2011 Kowalczyk ........... G02B 6/445 385/135
2011/0274403 A1* 11/2011 LeBlanc .............. G02B 6/4452 385/135
2012/0033926 A1* 2/2012 de Jong ............... G02B 6/3879 385/135
2014/0003771 A1* 1/2014 Isenhour .............. G02B 6/3831 385/77
2015/0060539 A1* 3/2015 Thompson ........... G02B 6/3895 235/375
2018/0011271 A1 1/2018 Reagan et al.
2018/0348450 A1 12/2018 Smith et al.
2018/0372972 A1 12/2018 Solheid et al.
2018/0372973 A1 12/2018 Solheid et al.
2019/0064460 A1 2/2019 Solheid et al.
2019/0064461 A1 2/2019 Solheid et al.
2019/0079256 A1 3/2019 Landry et al.
2019/0196120 A1 6/2019 Smith et al.
2019/0265427 A1* 8/2019 LeBlanc .............. G02B 6/3897

* cited by examiner

CENTRAL
OFFICE
110
120
100
125
F1
FDH
130
F2
115
104
105

202
200
204
220
225
270
282
230
215
230
235
250
214
260
275
260
235
225
275
286
235
217
287
237
245
216
240
281
288
212
210

260
261
262
263
235
237
265
D
H 269
260
262
265
265
265
265
261
268
264
266
267
W

COMMON MODULE STORAGE WITHIN A FIBER DISTRIBUTION HUB

CROSS-REFERENCE TO RELATED APPLICATIONS

This application claims the benefit of U.S. Provisional Application No. 62/635,865, filed Feb. 27, 2018, and titled "Common Module Storage within a Fiber Distribution Hub," the disclosure of which is hereby incorporated herein by reference.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 101 that connects a number of end subscribers 105 (also called end users 105 herein) in a network. The central office 110 can additionally connect to a larger network such as the Internet (not shown) and a public switched telephone network (PSTN). The network 100 can also include fiber distribution hubs 130 having one or more optical splitters (e.g., 1-to-8 splitters, 1-to-16 splitters, or 1-to-32 splitters) that generate a number of individual fibers that may lead to the premises of an end user 115. The various lines of the network 100 can be aerial or housed within underground conduits.

The portion of the network 100 that is closest to central office 110 is generally referred to as the F1 region, where F1 is the "feeder fiber" from the central office 110. The portion of the network 100 closest to the end users 105 can be referred to as an F2 portion of network 100. The network 100 includes a plurality of break-out locations 125 at which branch cables 105 are separated out from the main cable lines 120. Branch cables 105 are often connected to drop terminals 104 that include connector interfaces for facilitating coupling of the fibers of the branch cables to a plurality of different subscriber locations 115.

Splitters used in an fiber distribution hub 130 can accept a feeder cable F1 having a number of fibers and may split those incoming fibers into, for example, 216 to 432 individual distribution fibers that may be associated with a like number of end user locations. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to fiber distribution hubs 130 as required.

Splitter pigtails can be stored at a connector holder location until service is desired. Example pigtail storage used in a fiber distribution hub 130 is disclosed in U.S. Pat. No. 7,218,827. Improvements are desired.

SUMMARY

Some aspects of the disclosure are directed to a fiber distribution hub including a fiber termination field and a module mounting location separate from the fiber termination field. The fiber termination field includes a plurality of optical adapters that act as a transition point between incoming and outgoing cables within the fiber distribution hub. One or more modules of various types can be mounted at the module mounting location. Non-limiting examples of module types include a splitter module, a connector storage module, and a fiber storage module.

A splitter module includes an optical splitter disposed within a body having an input and an output. The optical splitter splits optical signals received at the input onto pigtails extending through the output. The pigtails have ends terminated at fiber optic connectors. In certain examples, dust caps are mounted over end faces of the fiber optic connectors.

A connector storage module includes a body having a plurality of connector holder stations. Each connector holder station is configured to retain a fiber optic connector. In certain examples, each connector holder station retains a fiber optic connector with a dust cap mounted over the end face of the fiber optic connector. In certain examples, the connector storage module does not include an optical splitter. In certain examples, the connector holder stations are accessed laterally through a first side of the body while fibers (e.g., splitter pigtails) terminated by the fiber optic connectors extend through a front of the body. In an example, a cover mounts to the first side of the body to block access to the fiber optic connectors retained at the connector holder stations. In certain examples, the connector holder station includes a cable manager for holding excess length of the optical fibers terminated by the fiber optic connectors.

A fiber storage module includes a body in which a plurality of optical fibers (e.g., splitter pigtails) may be stored. For example, the body may define a spool or a plurality of bend radius limiters about which the optical fibers may be routed. In certain implementations, a coil or other section of the optical fibers are inserted into the body through a first side of the body while the optical fibers extend out of the body through a front of the body. In certain examples, the fiber storage module does not include an optical splitter. In certain examples, the fiber storage module does not include a connector holder station.

In certain examples, the module mounting location defines a plurality of module mounting spaces (e.g., slots) at which the various modules can be mounted in any desired order. For example, a splitter module can be mounted next to a connector storage module or next to a fiber storage module or next to another splitter module.

In some examples, the various modules have a common footprint so that any of the modules can fit at any of the module mounting spaces. In other examples, the various modules are each sized to interchangeably fit at any of the module mounting spaces. In certain examples, each of the various modules is configured to secure to (e.g., latch to, fasten to, friction-fit within etc.) one of the module mounting spaces.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

and

Figure 1:
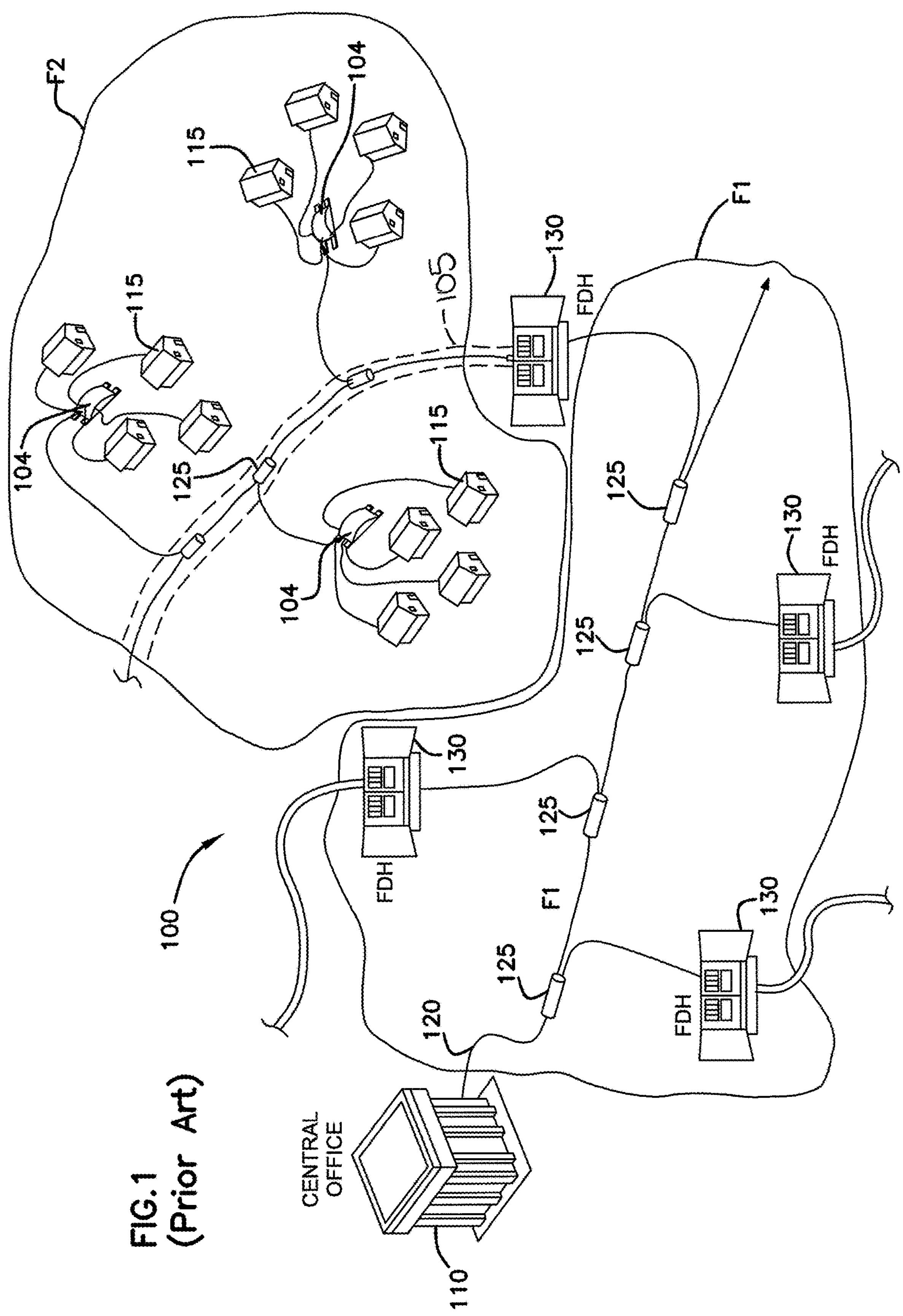
FIG. 1 shows a passive fiber optic network.
Figure 2:
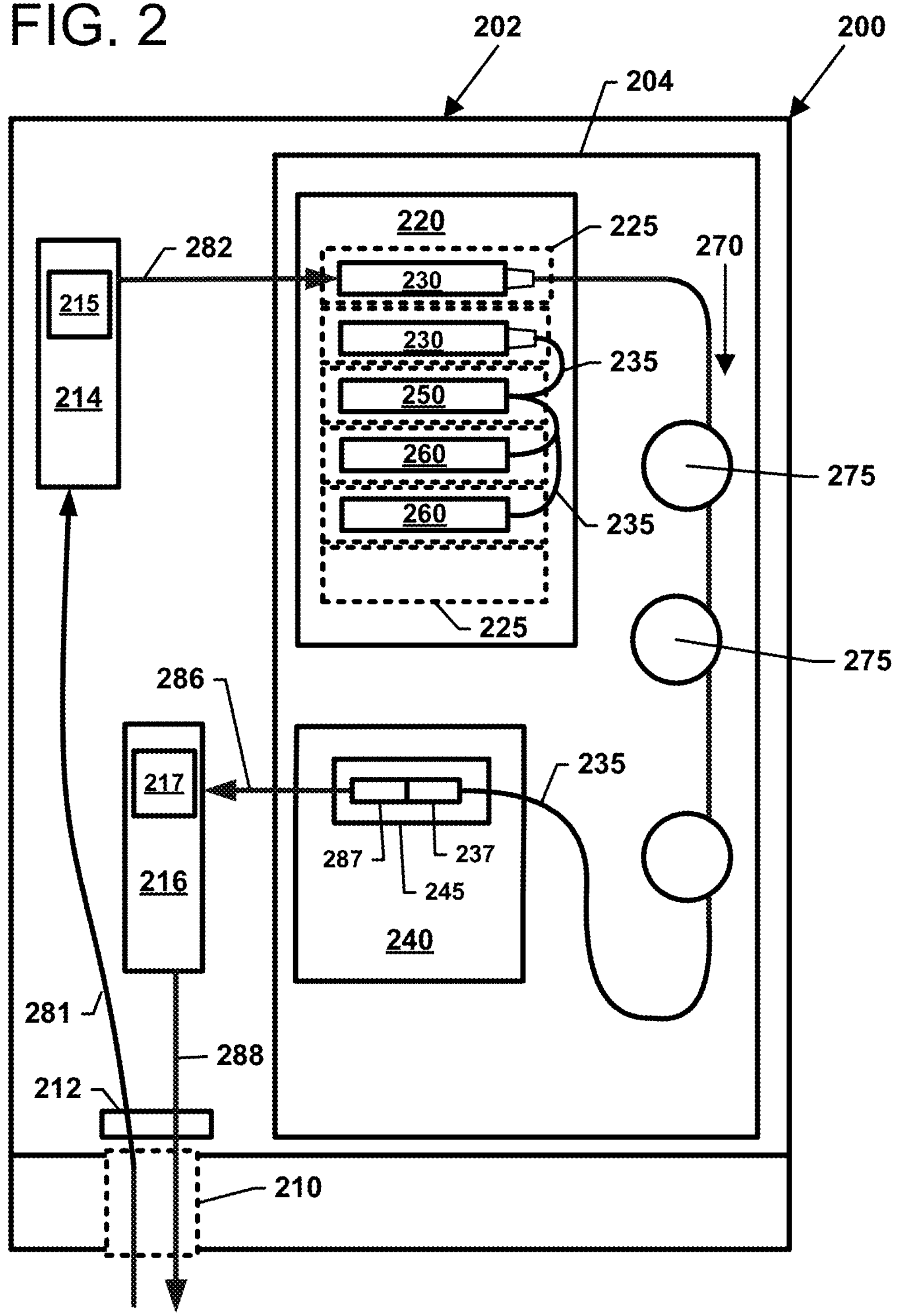
FIG. 2 is a schematic diagram of an example fiber distribution hub including a module mounting location and a termination field.
Figure 6:
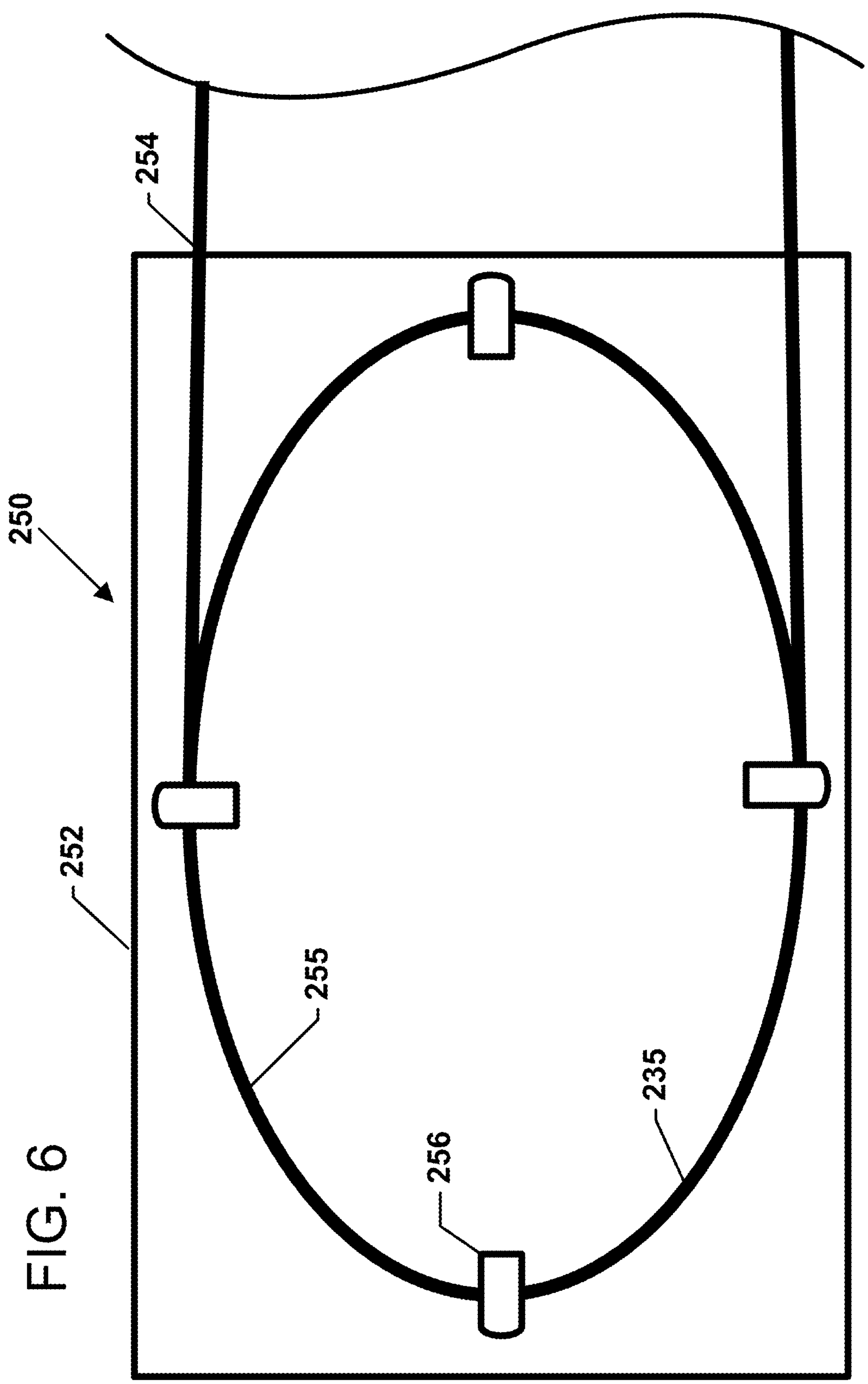

FIG. 6 is a schematic diagram of an example fiber storage module suitable for mounting at the module mounting location of the fiber distribution hub of FIG. 2.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a fiber distribution hub including a fiber termination field and a module mounting location separate from the fiber termination field. The fiber termination field includes a plurality of optical adapters that act as a transition point between incoming and outgoing cables within the fiber distribution hub. In certain examples, the module mounting location defines a plurality of module mounting spaces (e.g., slots) at which the various modules can be mounted in any desired order.

One or more modules of various types can be mounted at the module mounting location. Non-limiting examples of module types include a splitter module, a connector storage module, and a fiber storage module. For example, a splitter module can be mounted next to a connector storage module or next to a fiber storage module or next to another splitter module.

In some examples, the various modules have a common footprint so that any of the modules can fit at any of the module mounting spaces. In other examples, the various modules are each sized to interchangeably fit at any of the module mounting spaces. In certain examples, each of the various modules is configured to secure to (e.g., latch to, fasten to, friction-fit within etc.) one of the module mounting spaces.

Referring to FIG. 2, a fiber distribution hub 200 includes a cabinet 202 defining an interior. A termination field 240 and a module mounting location 220 are disposed within the interior of the cabinet 202. The termination field 240 includes optical adapters 245 having opposite first and second ports. The first ports face out from a first side of the termination field 240 and the second ports face out from a second side of the termination field 240. In certain examples, the termination field 240 is mounted to a swing frame chassis 204.

The cabinet 202 also includes a cable port 210 through which one or more input cables 281 and one or more output cables 288 enter the cabinet 202. In some examples, the cable port 210 is sealed (e.g., by a cable gland). In other examples, the cable port 210 is a ruggedized connectorized interface at which a feeder cable and a distribution cable can be optically connected to an internal input cable 281 and an internal output cable 288, respectively. The input and output cables 281, 288 (or feeder and distribution cables) are anchored to the cabinet 202 at an anchor point 212. In certain examples, the cables 281, 288 are clamped to the cabinet 202 at the anchor point 212.

The termination field 240 defines the connection point between the incoming cables 281 and the outgoing cables 288. In certain examples, the second ports of the optical adapters 245 at the termination field 240 are pre-cabled to connect to the outgoing cable 288. In the example shown, fibers 286 have first ends terminated at fiber optic connectors 287 plugged into the second ports of the adapters 245 and second ends routed to a cable interface location 216 at which an interface arrangement 217 is disposed. In some examples, the cable interface arrangement 217 includes one or more splice trays at which the second ends of the fibers 286 are spliced to the outgoing cable 288. In other examples, the cable interface arrangement 217 includes one or more optical adapters at which connectorized ends of the fibers 286 connect to connectorized ends of the outgoing cable 288. In still other examples, connectorized ends of the outgoing cable 288 can be routed directly to the second ports of the adapters 245 at the termination field 240.

In some implementations, connectorized ends of the incoming cable 281 can be routed directly to the module mounting location 220. In other implementations, however, the end of the incoming cable 281 is routed to a cable interface location 214 at which an interface arrangement 215 is disposed. In some examples, the cable interface arrangement 215 includes one or more splice trays at which the incoming cable 281 is spliced to module input fibers 282. In other examples, the cable interface arrangement 215 includes one or more optical adapters at which connectorized ends of the incoming cable 281 connect to connectorized ends of the module input fibers 282.

The module mounting location 220 is disposed within the cabinet 202 separate from the termination field 240. In certain examples, the module mounting location 220 also is mounted to a swing frame chassis. In an example, the module mounting location 220 is mounted to the same swing frame chassis 204 as the termination field 240. In some examples, the module mounting location 220 is disposed above the termination field 240. In other examples, the module mounting location 220 is disposed beneath the termination field 240. In still other examples, the module mounting location 220 is disposed side-by-side with the termination field 240.

The module mounting location 220 includes a plurality of mounting spaces 225. Each mounting space 225 is configured to receive one of a variety of types of modules. For example, each space 225 can interchangeably receive a splitter module 230, a fiber storage module 250, a connector storage module 260, or a pass-through module. Certain types of modules may take up more than one space 225. For example, a connector holder module 260 configured to hold SC connectors may take up two spaces 225 whereas a connector holder module 260 configured to hold LC connectors may take up a single space 225.

In some implementations, the module mounting location 220 includes a row of spaces 225 extending horizontally within the cabinet 202. In other implementations, the module mounting location 220 includes a column of spaces 225 so that the modules received thereat are stacked vertically. In some examples, the spaces 225 in the form of slots in which the modules are received. In certain examples, walls or partial walls may separate the slots 225. In other examples, the spaces 225 include a row or column of guide channels along which portions of the modules can slide. In certain examples, each space 225 has a retaining structure that secures the module at a fixed position in the space 225. For example, each space 225 can have a latch feature or fastener aperture that aligns with a latch feature or fastener aperture on the module.

Various types of modules can be mounted at the spaces 225. Modules also can be referred to as cartridges, cassettes, trays, housings, devices, or components. Non-limiting examples of suitable modules include a splitter module 230, a fiber/cable storage module 250, a connector holder module 260, and a pass-through module. In general, splitter modules 230 house optical splitters that split signals received at splitter inputs onto splitter pigtails. In some examples, a pass-through module may directly connect a connectorized pigtail to an input cable 281 or module input fiber 282 without splitting the signal. In other examples, a pass-through module may fanout a multi-fiber input cable 281 or multi-fiber module input cable 282 into a plurality of separate connectorized pigtails 235 without splitting the optical signals. Connector holder modules 260 store optical connectors within the modules. Fiber/cable storage modules store optical fiber or cables (e.g., excess length of pigtails) within the modules.

In use, one or more modules can be tethered together prior to installation at the cabinet 202. Tethered modules are movable relative to each other. Tethered modules can be installed at separate locations within the cabinet 202. Tethered modules are installed at the cabinet during the same general timeframe, but need not be loaded simultaneously. However, tether modules also can be installed at the cabinet as a unit.

For example, one or more splitter modules 230 and one or more connector storage modules 260 can be installed in the cabinet 202 at the module mounting location 220 at generally the same time. For example, a splitter module 230 can be installed at a first space 225 in the module mounting location 220 and one or more connector storage modules 260 can be installed at one or more additional spaces 225. Either module 230, 260 can be installed before the other. Each module 230, 260 is separately secured (e.g., latched, fastened, etc.) at the respective space 225. When service is not desired (e.g., when the splitter 230 is initially installed), the connectorized ends 237 of the splitter pigtails 235 output from the splitter 230 are retained at the one or more connector storage modules 260.

In certain implementations, a splitter module 230, a fiber/cable storage module 250, and a connector storage module 260 can all be tethered together. For example, the fiber/cable storage module 250 may be positioned between the splitter module 230 and the connector storage module 260. The fiber/cable storage module 250 holds the excess length of the pigtails 235 between the splitter module 230 and the connector storage module 260. In certain examples, each of the modules 230, 250, 260 is movable relative to the other modules. In certain examples, each of the modules 230, 250, 260 is separately loadable at different spaces 225 at the module mounting location 220.

When service is desired, the connectorized ends 237 of the splitter pigtails 235 are removed from the connector storage module 260. In certain implementations, the connector storage module 260 is removed from the respective space 225 before the connectorized ends 237 are removed from the connector storage module 260. In certain examples, the connectorized ends 237 cannot be removed from the connector storage module 260 while the connector storage module 260 is disposed at any of the spaces 225 of the module mounting location 220.

If the excess length of the pigtails are stored in the fiber storage module 260, then the pigtails 235 are removed from the fiber storage module 260. The splitter pigtails 235 are routed from the splitter module 230, along a fiber routing path 270, to the termination field 240. Connectorized ends 237 of the pigtails 235 are plugged into first ports of the optical adapters 245 at the termination field 240. Excess length of the pigtails 235 can be taken up by cable managers 275 (e.g., spools, half spools, bend radius limiters, clips, ties, etc.) along the fiber routing path 270.

Figure 3:
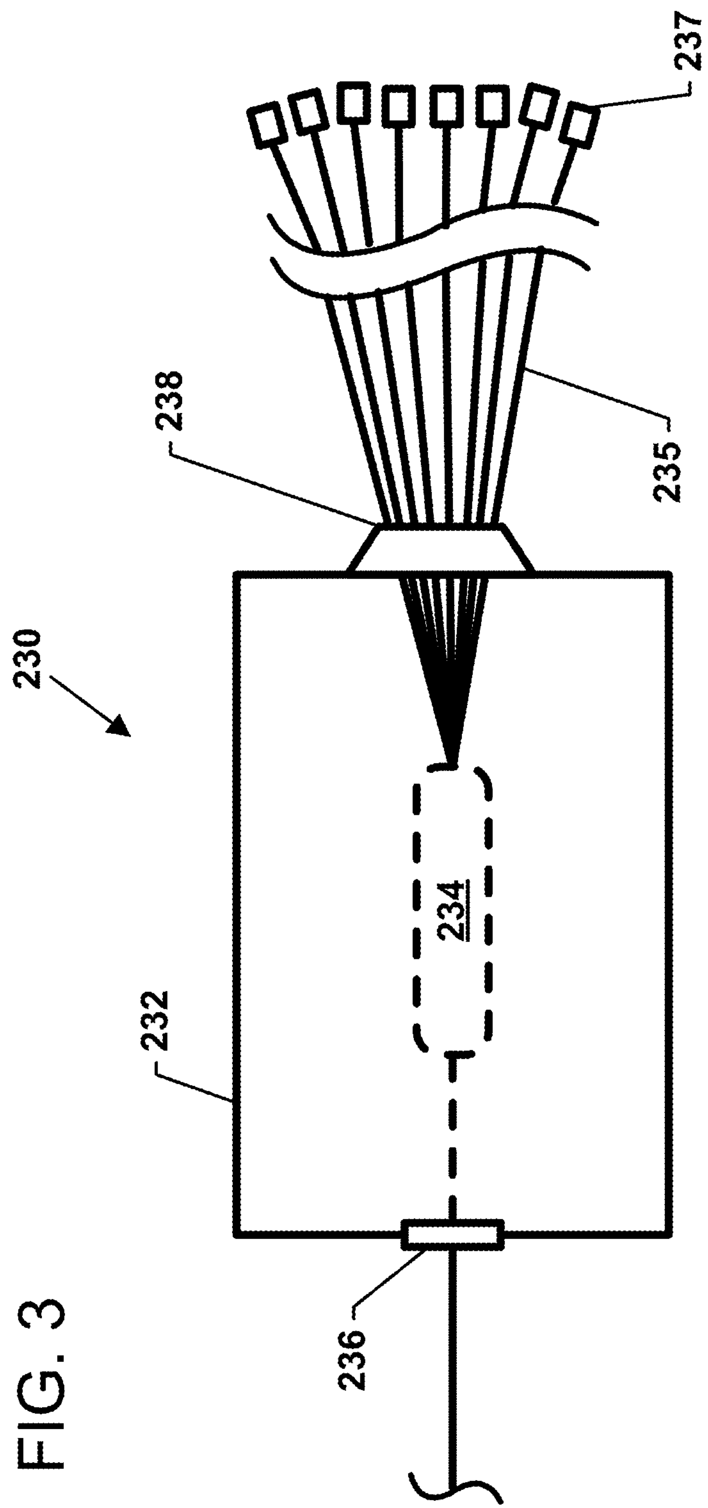
FIG. 3 is a schematic diagram of an example splitter module suitable for mounting at the module mounting location of the fiber distribution hub of FIG. 2.

FIG. 3 shows an example splitter module 230 suitable for use with the cabinet of FIG. 2. The example splitter module 230 includes a body 232 housing an optical splitter 234. The body 232 defines an input 236 and an output 238. The optical splitter 234 splits an optical signal received at the input 236 onto a plurality of pigtails 235 that extend through the output 238. In certain example, ends of the pigtails are connectorized with fiber optic connectors 237.

In some examples, the input 236 includes a port configured to receive a fiber optic connector terminating an end of an input cable 281 or module input fiber 282. In other examples, the input 236 includes a connectorized stub fiber that can be routed to the first cable interface arrangement 215. In some examples, the output 238 includes a strain relief boot extending outwardly from the housing 232 through which the pigtails 235 extend. In other examples, the output 238 can include a multi-fiber cable port or a plurality of single-fiber cable ports.

Figure 4:
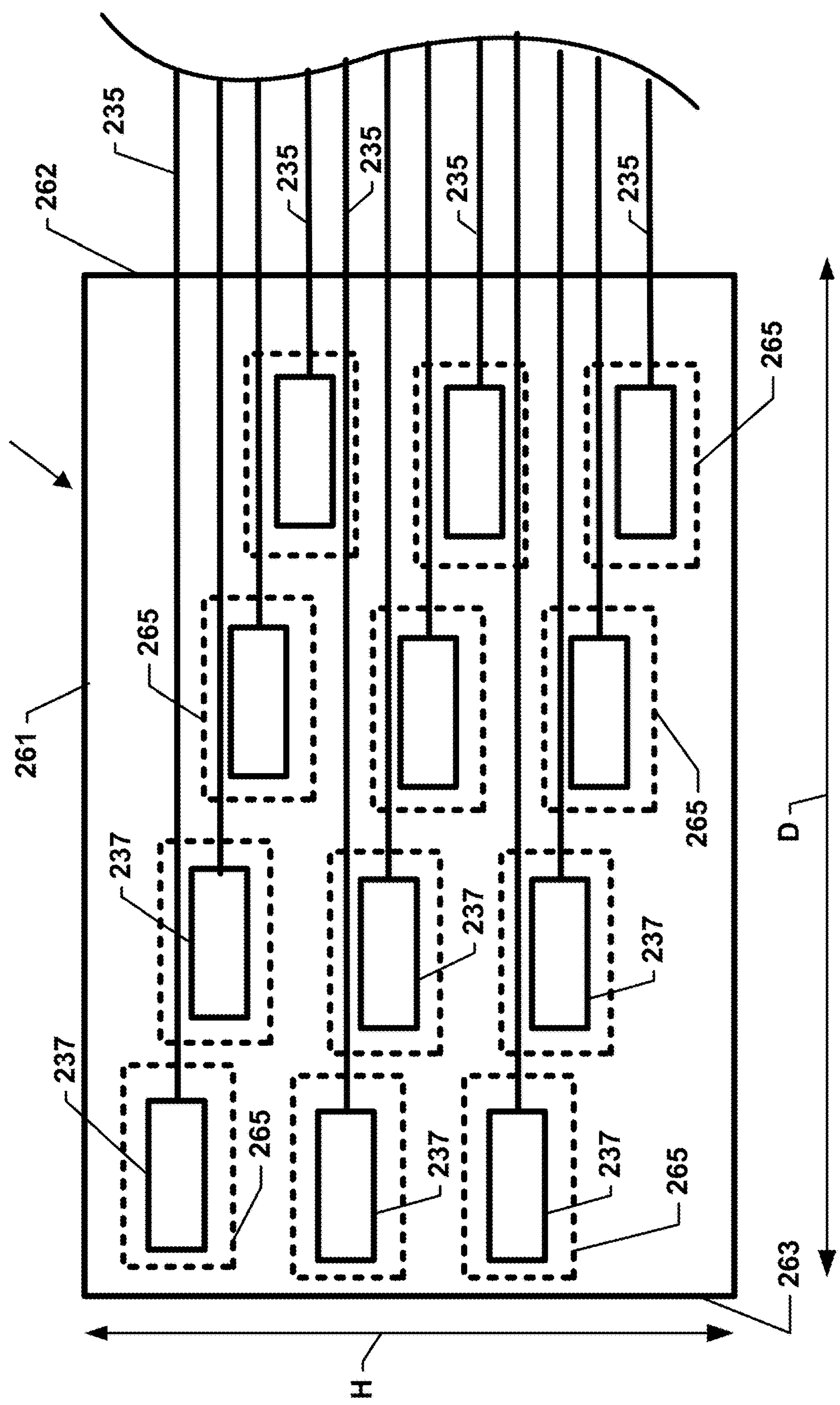
FIG. 4 is a schematic diagram of an example connector storage module suitable for mounting at the module mounting location of the fiber distribution hub of FIG. 2.
Figure 5:
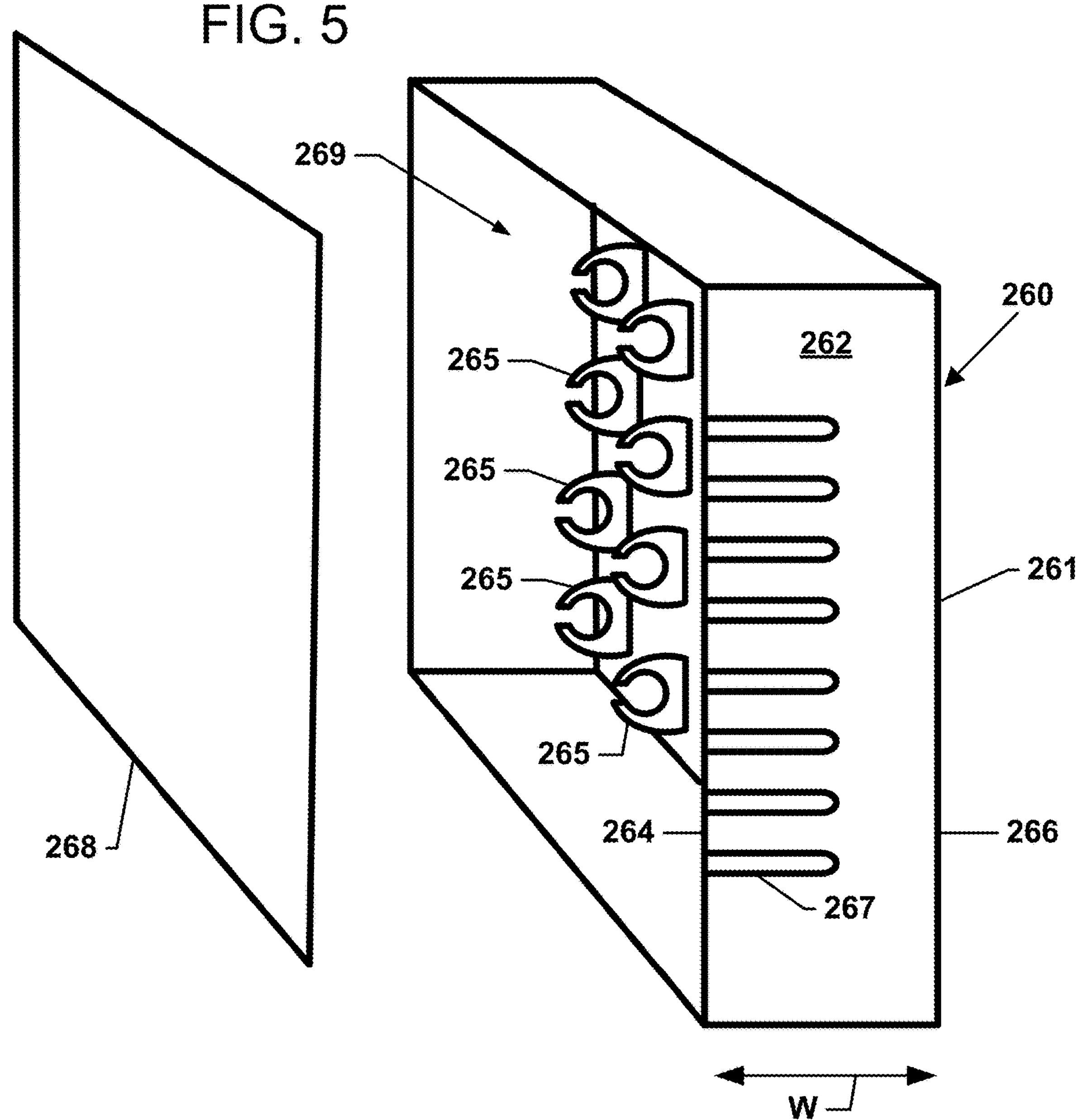
FIG. 5 is a perspective view of the connector storage module of FIG. 4.

FIGS. 4 and 5 shows an example connector storage module 260 suitable for use with the cabinet of FIG. 2 and/or splitter module of FIG. 3. The connector storage module 260 includes a body 261 having a depth D extending between a front (or cable entry end) 262 and a rear 263, a width W extending between opposite first and second sides 264, 266, and a height H extending between a top and a bottom of the body 261 to define an interior 269. The connector storage module 260 does not include an optical splitter.

One or more connector holder stations 265 are carried by the body 261. Connectorized ends of fibers or cables (e.g., connectorized ends 237 of pigtails 235) are retained at the connector holder stations 265. In some examples, the connector holder stations 265 hold onto fiber optic connectors terminating the ends of the fibers or cables. In certain examples, the connector holder stations 265 hold onto bodies of the fiber optic connectors. In certain examples, the connector holder stations 265 hold onto ferrules of the fiber optic connectors. In certain examples, the connector holder stations 265 hold onto strain-relief of the fiber optic connectors. In other examples, the connector holder stations 265 hold onto the fibers or cables adjacent the fiber optic connectors. In still other examples, the connector holder stations 265 hold onto the dust caps covering the optical end faces of the fiber optic connectors.

In certain examples, the connector holder stations 265 retain the fiber optic connectors with dust caps covering optical end faces (e.g., ferrule end faces) of the fiber optic connectors. In certain examples, the connector holder stations 265 include integral dust caps that cover the optical end faces of the fiber optic connectors mounted at the connector holder stations 265.

In certain implementations, the connector holder stations 265 are disposed within the interior 269 of the body 261. In certain implementations, the connector holder station 260 includes a plurality of connector holder stations 265 layered along the depth of the body 261. For example, a first connector holder station 265 is disposed at a first location along the depth and a second connector holder station 265 is disposed at a second location along the depth, the second location being different from the first location. In certain implementations, the connector holder stations 265 are staggered between the front 262 and rear 263 of the connector storage module 260. In certain implementations, a plurality of the connector holder stations 265 are spaced at different distances from the cable entry end 262 of the connector storage module 260.

In some examples, the first and second connector holder stations 265 are offset from each other along the height of the body 261. In other examples, the first and second connector holder stations 265 are aligned at a common height. In certain implementations, the connector holder stations 265 overlap along the height of the connector storage module 260.

In certain examples, the plurality of the connector holder stations 265 are spaced at different distances from the cable entry end 262 and the connector holder stations 265 overlap each other along the height of the connector storage module 265. In certain implementations, the connector holder module 260 can store more connectors than could fit within the surface area formed by the height and width of the connector holder module 260.

In some implementations, the body 261 includes at least four connector holder stations 265. In certain implementations, the body 261 includes at least six connector holder stations 265. In certain implementations, the body 261 includes at least eight connector holder stations 265. In certain implementations, the body 261 includes at least twelve connector holder stations 265. In certain implementations, the body 261 includes at least sixteen connector holder stations 265. In certain implementations, the body 261 includes between four and sixteen connector holder stations 265. In certain implementations, the body 261 includes between eight and twelve connector holder stations 265.

In some implementations, the connectorized ends can be snap-fit at the connector holder stations 265. For example, certain types of connector holder stations 265 include latching arms configured to receive the connectorized ends when the connectorized ends are pressed into the latching arms. In other implementations, the connector holder stations 265 include depressions in the housing sized and shaped to fit the connectorized ends when the connectorized ends are pressed into the depressions. For example, the connectorized ends may be friction fit within the depressions. In certain examples, the depressions may be defined in foam or another elastic material. In certain implementations, the connectorized ends can be fastened (e.g., by push pins, by screws, or by other such fasteners) to the connector holder stations 265.

In certain implementations, the first side 264 of the body 261 is open or defines an opening providing access to the interior 269. The connectorized ends may be loaded at the connector holder stations 265 through the open first side 264 or opening. In certain examples, the connectorized ends can only be loaded at the connector holder stations 265 laterally through the first side 264 of the connector holder module 260. In certain examples, the connectorized ends cannot be accessed through the front 262, rear 263, top, or bottom of the connector module 260. In certain examples, the connectorized ends can be accessed through the first side 264, but not through the second side 266 of the module 260. Accordingly, the connectorized ends are not accessible when stored at the connector holder stations 265 while the connector holder module 260 is disposed at a space 225 at the module mounting location 220.

In some implementations, the front 262 of the body 261 defines slots 267 through which the optical fibers terminated by the fiber optic connectors enter the body 261. In other implementations, the front 262 may define a single aperture or slot through which the optical fibers enter the body 261. In still other implementations, the fiber optic connectors may be threaded into the body 261 through an aperture defined in the front 262.

In some implementations, the first and second sides 264, 266 of the body 261 are larger than the front 262 and rear 263 and are larger than the top and bottom. In certain implementations, the depth of the body 261 is larger than the height and is larger than the width. In the example shown, the depth is larger than the height, which is larger than the width. In certain examples, the depth is at least twice the width. In certain examples, the depth is at least three times the width. In certain examples, the depth is at least four times the width. In certain examples, the depth is at least five times the width.

In certain implementations, the height of the body 261 is between 100 mm and 130 mm. In certain implementations, the depth of the body 261 is between 100 mm and 180 mm. In certain implementations, the height of the body 261 is between 5 mm and 20 mm. In certain examples, the height of the body 261 is between 110 mm and 120 mm, the depth of the body 261 is between 120 mm and 160 mm, and the width of the body 261 is about 10 mm. In an example, the height of the body 261 is about 115 mm, the depth is about 140 mm, and the width is a factor of 10 mm (e.g., 10 mm, 20 mm, 30 mm).

In certain implementations, the height of the body 261 is between 100 mm and 130 mm, the width of the body is no more than 20 mm, and the body 261 holds at least four fiber optic connectors. In certain implementations, the height of the body 261 is between 100 mm and 130 mm, the width of the body is no more than 20 mm, and the body 261 holds at least eight fiber optic connectors. In certain implementations, the height of the body 261 is between 100 mm and 130 mm, the width of the body is no more than 20 mm, and the body 261 holds at least ten fiber optic connectors. In certain implementations, the height of the body 261 is between 100 mm and 130 mm, the width of the body is no more than 20 mm, and the body 261 holds at least twelve fiber optic connectors. In certain implementations, the height of the body 261 is between 100 mm and 130 mm, the width of the body is no more than 20 mm, and the body 261 holds at least sixteen fiber optic connectors.

In certain implementations, the height of the body 261 is between 100 mm and 130 mm, the width of the body is about 10 mm, and the body 261 holds at least four fiber optic connectors. In certain implementations, the height of the body 261 is between 100 mm and 130 mm, the width of the body is about 10 mm, and the body 261 holds at least eight fiber optic connectors. In certain implementations, the height of the body 261 is between 100 mm and 130 mm, the width of the body is about 10 mm, and the body 261 holds at least ten fiber optic connectors. In certain implementations, the height of the body 261 is between 100 mm and 130 mm, the width of the body is about 10 mm, and the body 261 holds at least twelve fiber optic connectors. In certain implementations, the height of the body 261 is between 100 mm and 130 mm, the width of the body is about 10 mm, and the body 261 holds at least sixteen fiber optic connectors.

In certain implementations, the body 261 has a volume of no more than 175,000 $mm^3$. In certain implementations, the body 261 has a volume of no more than 170,000 $mm^3$. In certain implementations, the body 261 has a volume of no more than 165,000 $mm^3$. In certain implementations, the body 261 has a volume of between about 160,000 $mm^3$ and 165,000 $mm^3$. In certain implementations, the body 261 has a volume of about 161,000 $mm^3$.

In certain implantations, the body 261 has a volume of no more than 165,000 $mm^3$ and holds at least six connectors. In certain implantations, the body 261 has a volume of no more than 165,000 $mm^3$ and holds at least eight connectors. In certain implantations, the body 261 has a volume of no more than 165,000 $mm^3$ and holds at least twelve connectors. In certain implantations, the body 261 has a volume of no more than 165,000 $mm^3$ and holds at least sixteen connectors. In certain implantations, the body 261 has a volume of about 161,000 $mm^3$ and holds at least six connectors. In certain implantations, the body 261 has a volume of about 161,000 $mm^3$ and holds at least eight connectors. In certain implantations, the body 261 has a volume of about 161,000 $mm^3$ and holds at least twelve connectors. In certain implantations, the body 261 has a volume of about 161,000 $mm^3$ and holds at least sixteen connectors.

In certain implementations, two or more of the modules 230, 250, 260 have a common form factor. In certain implementations, the connector storage module 260 has a three-dimensional footprint that generally corresponds with a three-dimensional footprint of the splitter module 230. In certain examples, the three-dimensional footprint of the connector storage module 260 is the same as the three-dimensional footprint of the splitter module 230. In other examples, the three-dimensional footprints are different, but are both sized and shaped to fit within the spaces 225 defined at the module mounting location 220. In certain examples, the splitter module 230 and the connector holder module 260 have the same height, depth, and width even while having differently shaped peripheries.

In certain implementations, the connector holder stations 265 retain the fiber optic connectors fully within the volume of the body 261. In some implementations, the first side 264 of the body 261 remains open to facilitate accessing the fiber optic connectors at the connector holder stations 265. In other implementations, a cover 268 can be mounted to the first side 264 of the body 261 to enclose the fiber optic connectors and/or connector holder stations 265. In certain examples, the cover 268 can be sealed to the body 261.

In certain implementations, the connector holder station 265 is configured to manage at least some excess length of the pigtails 235 or other fibers/cables received at the connector storage module 260. For example, the excess length can be stored in one or more loops of coils. In certain examples, the connector storage module 260 stores the excess length within the body 261 of the connector storage module 260. In some examples, the connector storage module 260 stores the excess length at a common side with the connector holder stations 265. In other examples, the connector holder stations 265 store the excess length at an opposite side of a wall or bulkhead from the connector holder stations 265. In certain examples, the excess length is stored at an exterior of the body 261.

In certain implementations, the connector storage module 260 includes a cable manager at which an excess length of the pigtails 235 can be stored. In some examples, the cable manager is disposed within the body 261 to route the pigtails 235 in one or more coils about the connector holder stations 265. In other examples, the cable manager is disposed at an exterior of the body 261. In certain examples, the cable manager includes a spool coupled to the front 262 or side 264 of the body 261. The certain examples, the cable manager includes a plurality of bend radius limiters positioned to guide the excess length about a front face or side face of the body 261. In other implementations, the excess length of the splitter pigtails 235 is managed separate from the connector holder module 260 (e.g., along the cable routing path 270, at a fiber storage module 250, etc.).

FIG. 6 shows an example fiber storage module 250 suitable for use with the cabinet 202 of FIG. 2. The fiber storage module 250 includes a body 252 configured to hold an excess length of one or more fibers 255 (e.g., splitter pigtails 235). The body 252 of the fiber storage module 250 does not include an optical splitter. Guiding structure including one or more guide members 256 can be disposed within the body 252 to inhibit excess bending of the fibers 255 stored within the body 252. For example, the guides 256 may include radius limiters, spools, tabs, or other structures about which the fibers 255 can be routed.

In some examples, the body 252 defines a first side that is open or defines an opening through which the fibers 255 can be installed into the body 252. In certain examples, the body 252 also defines a front face defining apertures or slots through which the fibers 255 may extend so that the fibers remain within a width of the body 252. In certain examples, a cover can be mounted to the first side to enclose the fibers 255. Referring back to FIG. 2, in certain implementations, two or more of the modules 230, 250 260 may be coupled together prior to installation at the cabinet 202. For example, the connectorized ends of the splitter pigtails may be stored at the connector holder stations within one or more connector storage modules 260. Accordingly, the connector holder module 260 is tethered to the splitter module 230 prior to installation of the modules 230, 260 at the cabinet 202. The connector holder stations of the connector storage module(s) 260 can be loaded with the connectorized ends 237 of the splitter pigtails 235 at the factory.

During installation a splitter module 230 and a connector storage module 260 are mounted at respective spaces 225 of the module mounting location 220. The connectorized ends 237 may remain within the connector holder module 260 during installation of the splitter module 230 and the connector holder module 260. A connectorized end of an incoming cable 281 or a module input fiber 282 is routed to the input 236 of the splitter module 230.

In certain implementations, one or more fiber storage modules 250 are tethered to the splitter module 230 and/or to the connector storage module 260. In certain examples, the pigtails 235 of the splitter 230 may be loaded into the fiber storage module 250 at the factory and remain within the fiber storage module 250 during installation of the splitter module 230 and the fiber storage module 250.

When service is requested, a user removes the one or more connector storage modules 260 from the respective space(s) 225 at the module mounting location 220 and removes the desired number of fiber optic connectors 237 from the respective connector holder stations 265. In certain examples, the user also removes the one or more fiber storage modules 250 from the respective space(s) 225 at the module mounting location 220 and removes the excess pigtail length from the fiber storage module 250. The user routes the pigtails 235 through the fiber routing path 270 to the termination field 240 at which the fiber optic connector (s) 237 are plugged into the first port(s) of respective fiber optic adapter(s) 245.

If any fiber optic connectors 237 remain retained at the connector storage module 260, when the user may reinsert the connector storage module 260 at the respective space 225 at the module mounting location 225. In certain examples, the user also may reinsert excess fibers of the pigtails 235 corresponding to the stored connectors 237 back into the fiber storage module 250 and reload the fiber storage module 250 at the module mounting location 220.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A connector storage module comprising:

a body configured to be mounted within a cabinet, the body having a volume extending along a height between a top and a bottom of the body, extending along a width between an open first side and a second side of the body, and extending along a depth between a front and a rear of the body, the depth being perpendicular to the width and to the height, the width being perpendicular to the height, the front defining at least slot or aperture having a major dimension extending in a direction along the width between the open first side and the second side of the body, the at least slot or aperture extending between an interior of the body and an exterior of the body; and a plurality of connector holder stations carried within the body and accessible through the open first side of the body, each connector holder station being configured to retain a fiber optic connector so that the fiber optic connector is contained within the volume of the body, the plurality of connector holder stations being disposed in layers along the depth of the body between the front and the rear of the body and being disposed in layers along the height of the body between the top and the bottom of the body, each layer along the depth and the height of the body including multiple ones of the connector holder stations, the connector holder stations being configured to retain the fiber optic connectors in a common orientation so that longitudinal axes of the fiber optic connectors are held parallel to the depth and the fiber optic connectors extend in a common direction from the respective connector holder stations towards the front of the body.

2. The connector storage module of claim 1, wherein the connector holder stations are configured to receive the fiber optic connectors from the open first side of the body, wherein the connector holder stations are oriented so that fibers terminated by the fiber optic connectors extend through the front of the body.

3. The connector storage module of claim 2, further comprising a cover coupled to the open first side of the body to extend over the connector holder stations and close the first side.

4. The connector storage module of claim 1, wherein the height of the body is no more than 120 mm, the depth is no more than 150 mm, and the width is no more than 25 mm.

5. The connector storage module of claim 1, further comprising a cable manager disposed at the front of the body, the cable manager being configured to retain excess fiber length.

6. The connector storage module of claim 1, wherein the connector storage module does not include an optical splitter.

7. The connector storage module of claim 1, wherein the connector holder stations hold onto bodies of the fiber optic connectors.

8. The connector storage module of claim 1, wherein the connector holder stations hold onto ferrules of the fiber optic connectors.

9. The connector storage module of claim 1, wherein the connector holder stations hold onto strain-relief of the fiber optic connectors.

10. The connector storage module of claim 1, wherein the connector holder stations hold onto dust caps covering optical end faces of the fiber optic connectors.

11. The connector storage module of claim 1, wherein the connector holder stations retain the fiber optic connectors with dust caps covering optical end faces of the fiber optic connectors.

12. The connector storage module of claim 1, wherein the connector holder stations are staggered between the front and the rear of the body.

13. The connector storage module of claim 1, wherein the connector holder stations are offset from each other along the height of the body.

14. The connector storage module of claim 1, wherein the connector holder stations overlap along the height of the connector storage module.

15. The connector storage module of claim 14, wherein the connector holder stations are aligned at a common height.

16. The connector storage module of claim 1, wherein the fiber optic connectors can be snap-fit to the connector holder stations.

17. The connector storage module of claim 1, wherein the connector holder stations include depressions in the body sized and shaped to fit the fiber optic connectors when the fiber optic connectors are pressed into the depressions.

18. The connector storage module of claim 1, wherein the depth of the body is larger than the height and is larger than the width; and wherein the height is larger than the width.

19. The connector storage module of claim 3, wherein the cover is sealed to the body.

20. The connector storage module of claim 1, wherein the connector storage module is disposed at a module mounting location within a cabinet, the module mounting location being separate from a termination field that is also disposed within the cabinet, and wherein a splitter module also is disposed at the module mounting location.

21. The connector storage module of claim 20, wherein the module mounting location defines a plurality of commonly sized openings, wherein the connector storage module is mounted at a first of the commonly sized openings and the splitter module is disposed at a second of the commonly sized openings.

* * * * *